Dec. 4, 1934.  H. W. FLETCHER  1,983,279
PIPE THREAD GAUGE
Filed Aug. 4, 1930
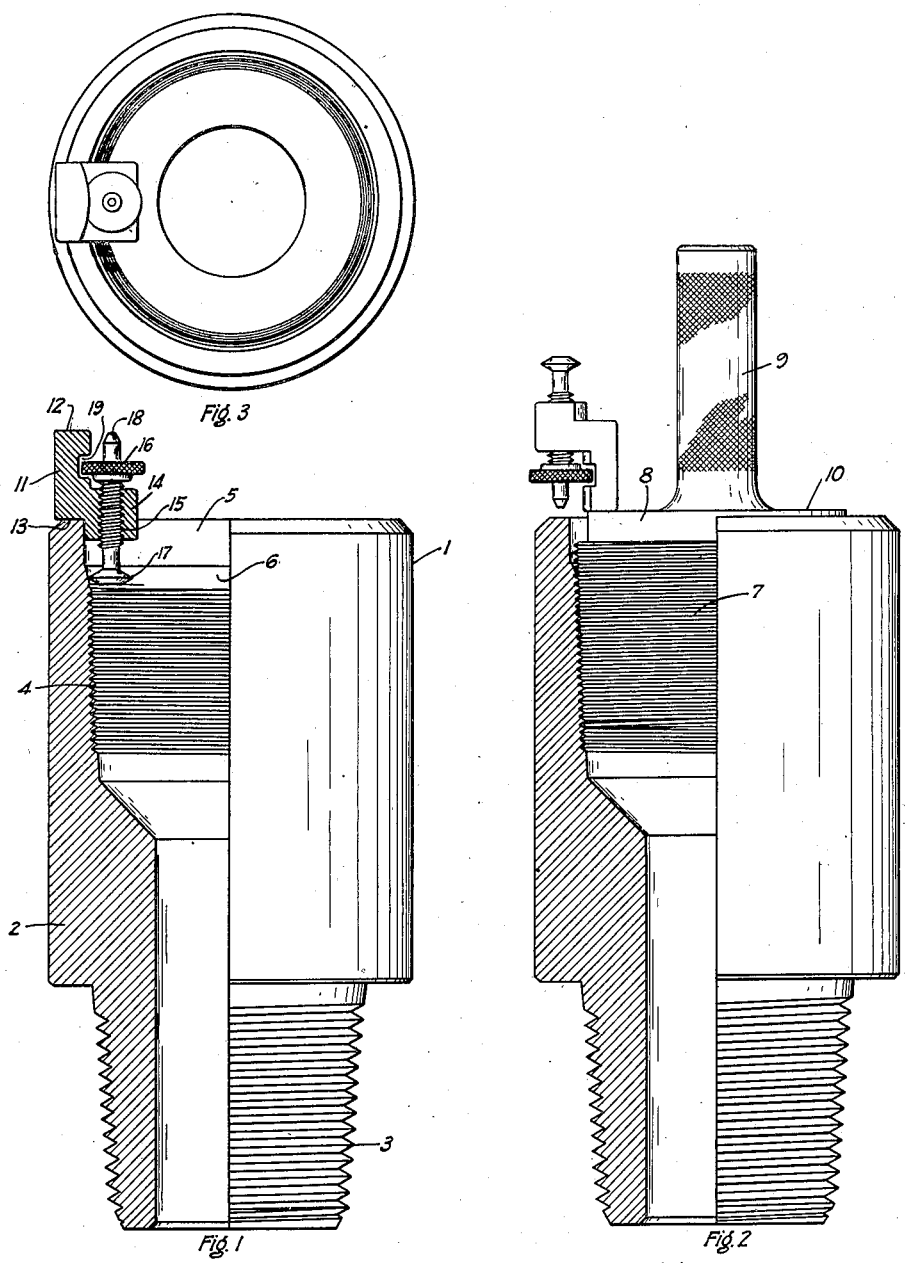
Harold W. Fletcher  INVENTOR
BY
Jesse R. Stone ATTORNEY Patented Dec. 4, 1934

1,983,279

UNITED STATES PATENT OFFICE 1,983,279

PIPE THREAD GAUGE

Harold W. Fletcher, Houston, Tex., assignor to Hughes Tool Company, Houston, Tex., a corporation of Texas.

Application August 4, 1930, Serial No. 472,960

4 Claims. (Cl. 33—170)

My invention relates to gauges for use in checking the accuracy of the threads on pipe ends and the mating couplings therefor. The device is particularly adapted for use in checking the fit of drill pipe with the tool joints employed in connecting the pipe sections together.

In screwing the tool joint members to the ends of the drill stem which are to be coupled together, it is necessary that the connection be accurate to within a fairly small tolerance. The joints must be fluid tight, and must be strong to withstand the heavy torsional strain to which they are subjected in use.

To obtain accuracy in the connection between the tool joint and the pipe, the pipe engaging end of the joint is carefully formed and threaded. The thread is then tested by a plug gauge representing the usual pipe end to determine the interfitting of the joint and pipe. It has been found difficult to determine the degree of accuracy with which the thread and box are formed. A measurement must be made between the first thread scratch on the box and the last thread scratch upon the pipe when the plug gauge is screwed within the end of the tool joint. With the plug gauge screwed in place, the measurement with rule or ordinary tools is obstructed by the parts of the joints and a separate measurement of each member consumes too much time.

It is an object of my invention to provide a thread testing gauge easily applied to the joint to measure the degree of interfitting of the pipe in the tool joint when the connection is made. I aim to provide a handy tool which is easily and quickly applied in making the necessary measurements in testing the threads.

In the drawing herewith Fig. 1 is a side view in central longitudinal section of my gauge shown as applied to a tool joint member.

Fig. 2 is a side view of the tool shown in position upon the plug gauge.

Fig. 3 is a top plan view of the tool and the tool joint in the position shown in Fig. 1.

The tool joint member 1 shown in the drawing is of ordinary construction. It has a body portion 2 cylindrical on its outer periphery. The lower end is reduced in outer diameter and formed with a coarsely threaded pin 3.

The upper end has a box or socket threaded at 4 for attachment to the threaded male end of the pipe section, not shown. This socket is slightly tapered inwardly and the thread is accurately formed to receive the pipe. The extreme outer end of the socket is enlarged slightly in internal diameter and is not threaded at 5. From the area 5 to the threaded socket there is a beveled area 6, and when the threads are cut upon the box or socket 4 the first scratch left by the thread cutting tool comes at or near the juncture of this beveled area and the socket itself.

To test the fit of the male member within the threaded box, a plug gauge is used to represent the pipe. This gauge is shown at 7 in Fig. 2. It has a threaded area above which it is reduced slightly in diameter at 8 and a shoulder 10 at the upper end is formed at the calculated distance from the lower end to represent the last scratch upon the threaded pipe. A knurled handle 9 is provided by means of which the male member may be screwed into the coupling or tool joint.

In testing the joint, the plug gauge member is screwed into the box as far as may be done by hand. The distance between the last scratch upon the gauge representing the pipe and the first scratch in the box is then to be measured to determine the accuracy of the threads. This is done by my improved tool.

My measuring gauge includes a body 11 comprising a block of metal having an upper shoulder 12 and a lower shoulder 13. Below the shoulder 13 there is a downward extension 14 having a threaded opening therethrough to receive a gauge pin 15. Said pin has a knurled flange 16 thereon by which the pin may be rotated. Said flange fits within a notch 19 in the side of the body, and the upper and lower sides of the notch or recess limit the adjustment of the gauge pin.

The lower end of the pin has a head thereon which is beveled to a knife edge 17 to form a line for registration with the scratch upon the tool joint socket. The upper end of the gauge pin 19 is tapered and the extremity flattened to furnish another point from which the position of the thread may be calculated.

In the use of the gauge, the tool is seated with the shoulder 13 upon the upper end of the tool joint. The lower edge 17 of the gauge pin is then adjusted to register exactly with the last scratch of the thread in the box. This fixes the position of the upper end 18 of the pin relative to the upper shoulder 12 of the body of the gauge. If, in making the adjustment of the gauge pin to bring the knife edge into registration with the first scratch on the tool joint, as shown in Fig. 1, the knurled flange 16 contacts with either shoulder of the recess 19 the thread is at once indicated as in error sufficiently to cause the joint to be rejected. If it is not sufficiently off, the gauge pin is left in its adjusted position, and the tool is removed.

The plug gauge 7 is then screwed into position in the socket 4 as far as can be done by hand. The thread gauge is then inverted from its position shown in Fig. 1, and without changing the position of the gauge pin, the shoulder 12 thereon is placed upon the upper end of the plug gauge 7, as shown in Fig. 2, with the end 18 of the gauge pin over the upper shoulder of the tool joint. A flat gauge plate whose thickness is known, is inserted between the end 18 of the gauge pin and the tool joint shoulder to determine the distance between them. If this distance is too great or too small, the joint is discarded. If the thread upon the tool joint box is correct, the distance between the end of the gauge pin and the shoulder will vary within only a limited tolerance. When the gauge is in the position shown in Fig. 1, and the thread is exactly right, the shoulder 12 and the end 18 of the pin will vary within a predetermined distance depending upon the depth of the scratch. However, a limited tolerance either negative or positive is allowable. When the plug gauge is then screwed into the tool joint socket, the shoulder 10 on the plug gauge should come within a certain distance of the upper shoulder of the tool joint. A limited tolerance here is also allowed. By the use of my thread gauge I obtain the resulting error, if any, in the distance between the first scratch on the joint and the last scratch upon the pipe without the necessity of considering the length of the counterbore 5. This is accomplished quickly and without the necessity of measurement by rule and the calculation of the total error. When the tool is in the position shown in Fig. 2, the error is at once apparent by noting the distance from the point 18 to the upper end of the joint.

The tool is a simple one easily adjusted and handy for use in determining the accuracy of the threads upon the tool joint or other coupling, it being understood that the tool joint is only illustrative as the tool is adapted for use on any type of coupling having a counter bore at its ends.

What I claim as new is:

1. A measuring gauge for tool joint threads and the like including a block having upper and lower shoulders, a gauge pin adjustable longitudinally in said block, a knife edge formed at one end of said pin extending below said lower shoulder to register with the outer thread scratch on the tool joint socket, a flattened end at the other extremity of said pin, and means to limit the longitudinal adjustment of said pin in both directions.

2. A measuring gauge for tool joint threads and the like including a block having upper and lower shoulders, a gauge pin adjustable longitudinally in said block, a knife edge formed at one end of said pin extending below said lower shoulder to register with the outer thread scratch on the tool joint or coupling socket, a flattened end at the other extremity of said pin, and a knurled flange on said pin, said flange projecting into a recess in said body to limit the movement of said pin.

3. A measuring gauge for tool joint threads and the like including a body having fixed upper and lower shoulders, a gauge pin threaded for adjustment in said body, the ends of said pin forming upper and lower gauge marks, means between said ends whereby said pin can be rotated to vertically adjust said pin in said body, said means acting also to limit longitudinal movement of said pin in said body in both directions.

4. A measuring gauge for tool joint threads and the like wherein the tool joint has a flattened end forming a seat and threads spaced inwardly therefrom, comprising a body having upper and lower shoulders, a lateral projection from said body, a threaded pin adjustable longitudinally in said projection, registering means at each end of said pin, and a knurled flange on said pin projecting into a notch in said body and limited in its movement by the sides of said notch.

HAROLD W. FLETCHER.